US012239929B2

(12) United States Patent
Harder et al.

(10) Patent No.: US 12,239,929 B2
(45) Date of Patent: Mar. 4, 2025

(54) FILTER CARTRIDGE HAVING AIR VENT WITH RESTRICTION, ASSEMBLIES, AND METHODS

(71) Applicant: Donaldson Company, Inc., Minneapolis, MN (US)

(72) Inventors: David B. Harder, Burnsville, MN (US); Kurt Joscher, Burnsville, MN (US); Jacob L. Sanders, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 508 days.

(21) Appl. No.: 17/281,903

(22) PCT Filed: Sep. 23, 2019

(86) PCT No.: PCT/US2019/052458
§ 371 (c)(1),
(2) Date: Mar. 31, 2021

(87) PCT Pub. No.: WO2020/072225
PCT Pub. Date: Apr. 9, 2020

(65) Prior Publication Data
US 2021/0379515 A1    Dec. 9, 2021

Related U.S. Application Data

(60) Provisional application No. 62/742,060, filed on Oct. 5, 2018.

(51) Int. Cl.
*B01D 36/00*  (2006.01)
*B01D 29/15*  (2006.01)
*B01D 35/30*  (2006.01)

(52) U.S. Cl.
CPC .......... *B01D 36/001* (2013.01); *B01D 29/15* (2013.01); *B01D 35/30* (2013.01);
(Continued)

(58) Field of Classification Search
CPC ...... B01D 36/001; B01D 29/15; B01D 35/30; B01D 2201/295; B01D 2201/316; B01D 2201/347; B01D 29/21
(Continued)

(56) References Cited

U.S. PATENT DOCUMENTS 7,147,110 B2    12/2006  Clausen et al.
7,299,931 B2    11/2007  Schachtrup et al.
(Continued)

FOREIGN PATENT DOCUMENTS

DE    102008062952 A1    7/2010
DE    102014002631 A1    8/2015
(Continued)

OTHER PUBLICATIONS

International Search Report and Written Opinion for PCT/US2019/052458, mailed Nov. 19, 2019.

*Primary Examiner* — Madeline Gonzalez
(74) *Attorney, Agent, or Firm* — Merchant & Gould P.C.

(57) ABSTRACT

An air filter cartridge for filtering liquids, such as fuel or oil, can be used in a filter assembly. The air filter cartridge has first and second opposite end caps and filter media extending between the end caps. The first end cap has an air channel with an inlet and an outlet to allow for the bleeding of air from the unfiltered side to the filtered side, while minimizing the amount of liquid allowed to bypass the media. Due to the viscosity differences of air versus liquid (e.g. a hydrocarbon such as fuel or oil), a long vent with at least one thin axis impedes liquid flow to a greater degree than air flow through the same vent.

20 Claims, 10 Drawing Sheets

(52) U.S. Cl.
CPC ............... *B01D 2201/295* (2013.01); *B01D 2201/316* (2013.01); *B01D 2201/347* (2013.01)

(58) Field of Classification Search
USPC .......... 210/436, 120, 188, 416.5, 450, 493.2
See application file for complete search history.

(56) References Cited

U.S. PATENT DOCUMENTS

| | | |
|---|---|---|
| 7,572,306 B2 | 8/2009 | Hawkins et al. |
| 9,011,585 B2 | 4/2015 | Hölker et al. |
| 9,186,602 B2 | 11/2015 | Rathod et al. |
| 2013/0068702 A1* | 3/2013 | Allen .................. B01D 35/005 210/232 |

FOREIGN PATENT DOCUMENTS

| | | |
|---|---|---|
| DE | 112014007014 T5 | 6/2017 |
| EP | 1440721 A1 | 7/2004 |
| EP | 2886181 A1 | 6/2015 |

* cited by examiner

FILTER CARTRIDGE HAVING AIR VENT WITH RESTRICTION, ASSEMBLIES, AND METHODS

This application is a US National Stage application of PCT International Patent application No. PCT/US2019/052458, filed Sep. 23, 2019, which and claims the benefit of priority to U.S. Provisional patent application Ser. No. 62/742,060, filed Oct. 5, 2018, which applications are incorporated herein by reference. To the extent appropriate, a claim of priority is made to each of the above disclosed applications.

TECHNICAL FIELD

This disclosure concerns filter cartridges and filter assemblies that use the filter cartridges. In particular, this disclosure concerns filter cartridges for filtering fuel or oil and having an air vent to reduce liquid bypass while still allowing air flow.

BACKGROUND

Air vents are commonly used in fuel filters to bleed air across the dirty side of filters to the clean side. These air vents are typically 0.4-0.7 mm holes, typically straight holes, in the filter end cap. These prior art designs allow for dirty fuel to bypass to the clean side in amounts that are undesirable.

Ratios of fuel to air viscosities range from 300 to 45 depending on the temperature. Even at warm temperatures air flows significantly more readily than fuel. Given these differences in viscosity of air versus liquid, it is recognized that improvements are possible.

SUMMARY

A filter cartridge and assembly is provided that improves the prior art. Examples of improvements include the recognition of the differences in viscosities of air and liquid by providing a long vent with at least one thin axis. This will impede liquid flow to a greater degree than air flow through the same vent.

In one aspect, a filter cartridge for filtering fuel or oil includes first and second opposite end caps; a tubular extension of filter media defining an open interior volume downstream of the filter media, wherein the filter media is secured to and extends between the first and second end caps; and the first end cap having an air channel. The air channel has an inlet and an outlet. The inlet is in communication with a volume upstream of the filter media, and the outlet is in communication with the open filter interior volume downstream of the filter media. The channel has an average cross-sectional area no greater than 0.5 mm^2 and a length between the inlet and outlet of at least 10 mm.

In some example embodiments, the first end cap is a closed end cap.

In embodiments having a closed end cap, the channel can be covered by a tab secured to the closed end cap.

In some embodiments, the channel is formed by adjoining at least two strips of a film material or thin polymer material where the channel is formed by removing a portion of one strip of film or thin polymer.

In some embodiments, the first end cap is an open end cap.

In embodiments where the first end cap is an open end cap, the first end cap has an axial extension extending away from the filter media, and the air channel is in the axial extension.

In embodiments having an axial extension on the first end cap, a seal member is held by the axial extension.

In some example embodiments, the seal member is a radial seal. In some example embodiments, the first end cap includes an inner end cap piece and an outer end cap piece secured together.

In embodiments where the first end cap is in two pieces, the inlet for the air channel can be defined by the outer end cap piece, and the outlet for the air channel can be defined by the inner end cap piece.

In example embodiments having a two piece first end cap, the inner end cap piece may define the channel.

In some example embodiments, the channel has an average height, and a ratio of the height to the channel length is no greater than 1:100.

In some example implementations, the channel has an average height of less than 0.010 inch.

In some examples, the channel length is at least 10 mm.

In example embodiments, the filter media is a pleated media, and the tubular extension is cylindrical.

In a further aspect, a filter assembly is provided. The filter assembly includes a filter cartridge as variously characterized above. A housing holds the cartridge and defines an unfiltered volume upstream of the filter cartridge. One of a filter head or filter base is removably attached to the housing.

In one or more example embodiments, the filter cartridge is removable and replaceable in the housing.

In example implementations, the filter head and the housing are threadably attached.

In some example arrangements, there is a standpipe extending from the filter base into the open filter volume.

In another aspect, a method of bleeding air from fuel in a filter assembly is provided. The method includes providing the filter assembly as variously characterized above. There is a step of permitting airflow from the unfiltered volume to the open interior volume downstream of the filter media by entering through the air inlet, flowing through the channel, and exiting through the air outlet.

A variety of examples of desirable features or methods are set forth in part in the description that follows, and in part, will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

A. Basic Assembly

Figure 1:
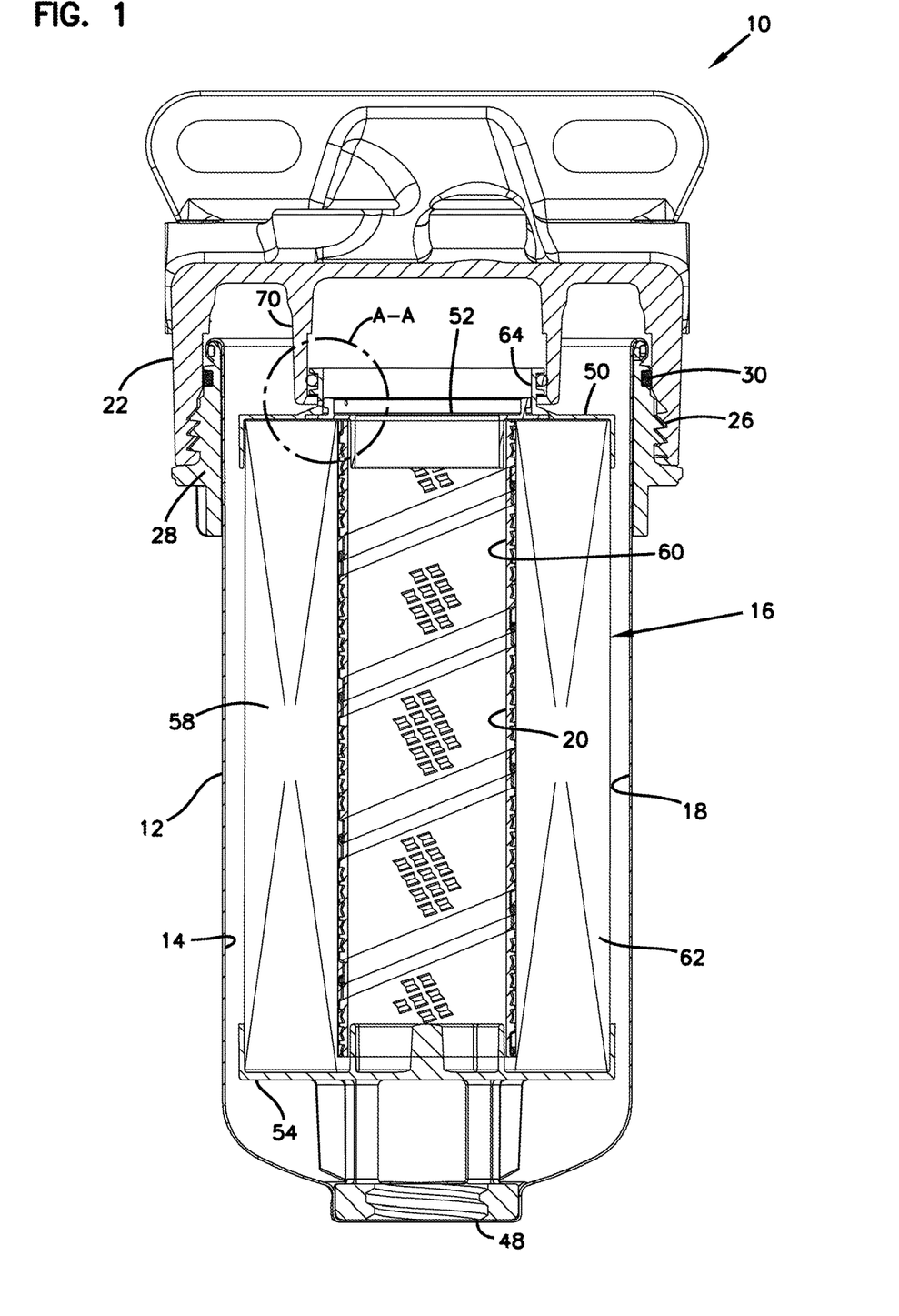
FIG. 1 is a cross-sectional view of a first embodiment of a filter assembly constructed in accordance with principles of this disclosure, the cross section being taken along the line 1-1 of FIG. 2.
Figure 5:
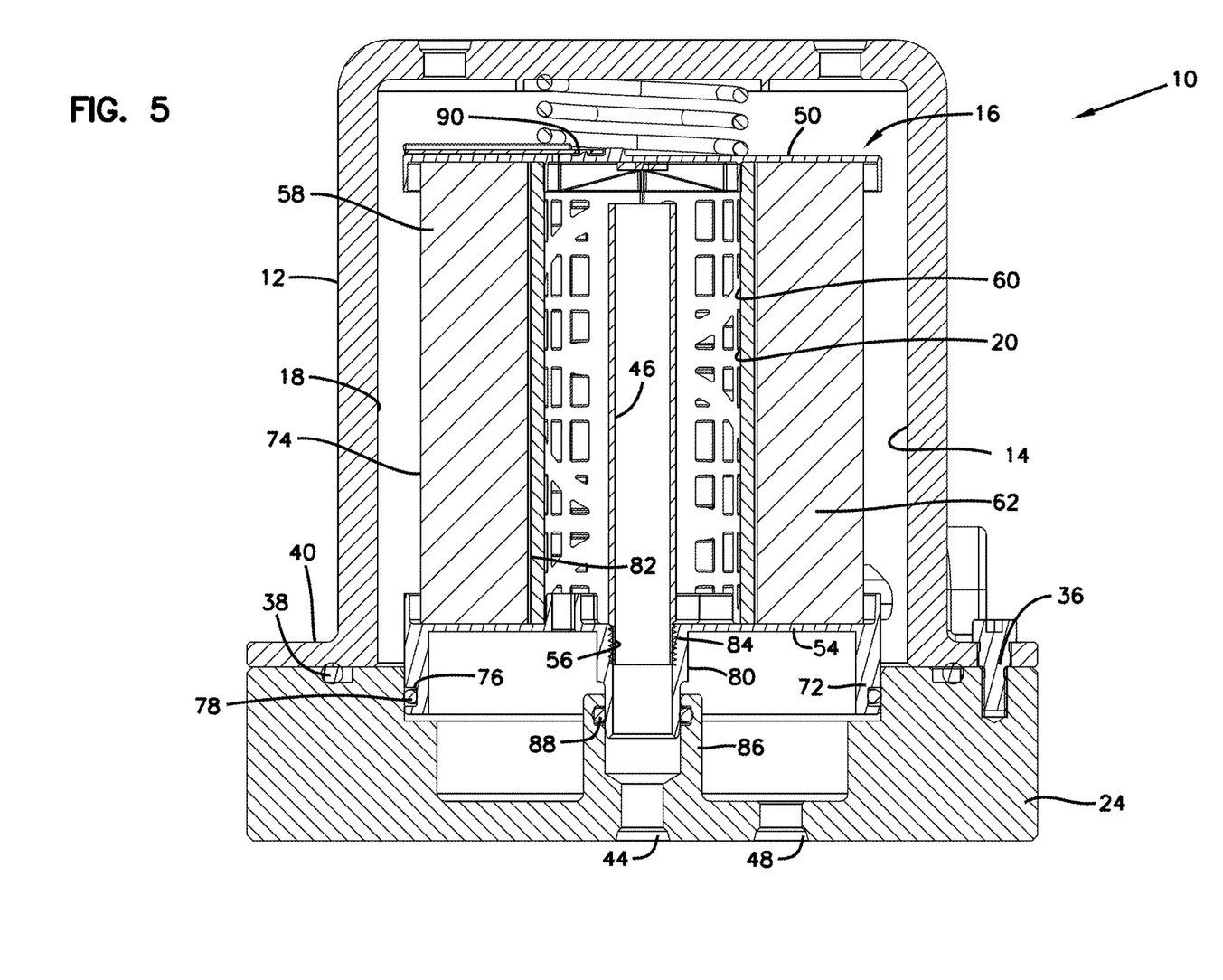
FIG. 5 is a cross-sectional view of a second embodiment of a filter assembly constructed in accordance with principles of this disclosure, the cross section being taken along the line 5-5 of FIG. 6.

Principles of this disclosure can be applied to many different types of systems and filter assemblies. Two example assemblies are shown in FIGS. 1 and 5 at reference numeral 10. The filter assembly 10 can be used with engines, such as diesel engines, to filter liquids including fuel or hydraulic oil. In many of these types of filter systems, air will be in the liquid being filtered, and it is helpful to allow the air to exit the assembly 10.

The filter assembly 10 includes a can or housing 12. The housing 12 has an interior volume 14. The housing 12 holds a filter cartridge 16 within the interior volume 14.

Within the interior volume 14 of the housing, there is an unfiltered liquid volume 18 upstream of the filter cartridge 16 and a filtered liquid volume 20 downstream of the filter cartridge 16.

In the assembly 10 of FIG. 1, the housing 12 is removably attached to a filter head 22. In the assembly 10 of FIG. 5, the filter housing 12 is removably attached to a filter base 24.

The assembly 10 of FIG. 1 is considered a bottom load assembly, because servicing of the assembly 10 is accomplished by accessing the assembly 10 from a region below the housing 12.

The assembly 10 of FIG. 5 is considered a top load assembly, as servicing of the assembly 10 is accomplished by accessing the assembly 10 from a region over or above the housing 12.

For the assembly 10 of FIG. 1, there is a threaded connection 26 between the housing 12 and the filter head 22. In the example shown, the housing 12 includes a threaded sleeve 28 secured to and against the external portion of the housing 12. The housing 12 and sleeve 28 can be one of the types as described in U.S. Pat. No. 9,545,587, incorporated herein by reference. As can be seen if FIG. 1, there is a seal member 30 held by the sleeve 28 that forms a seal between and against the sleeve 28 and the filter head 22.

Figure 2:
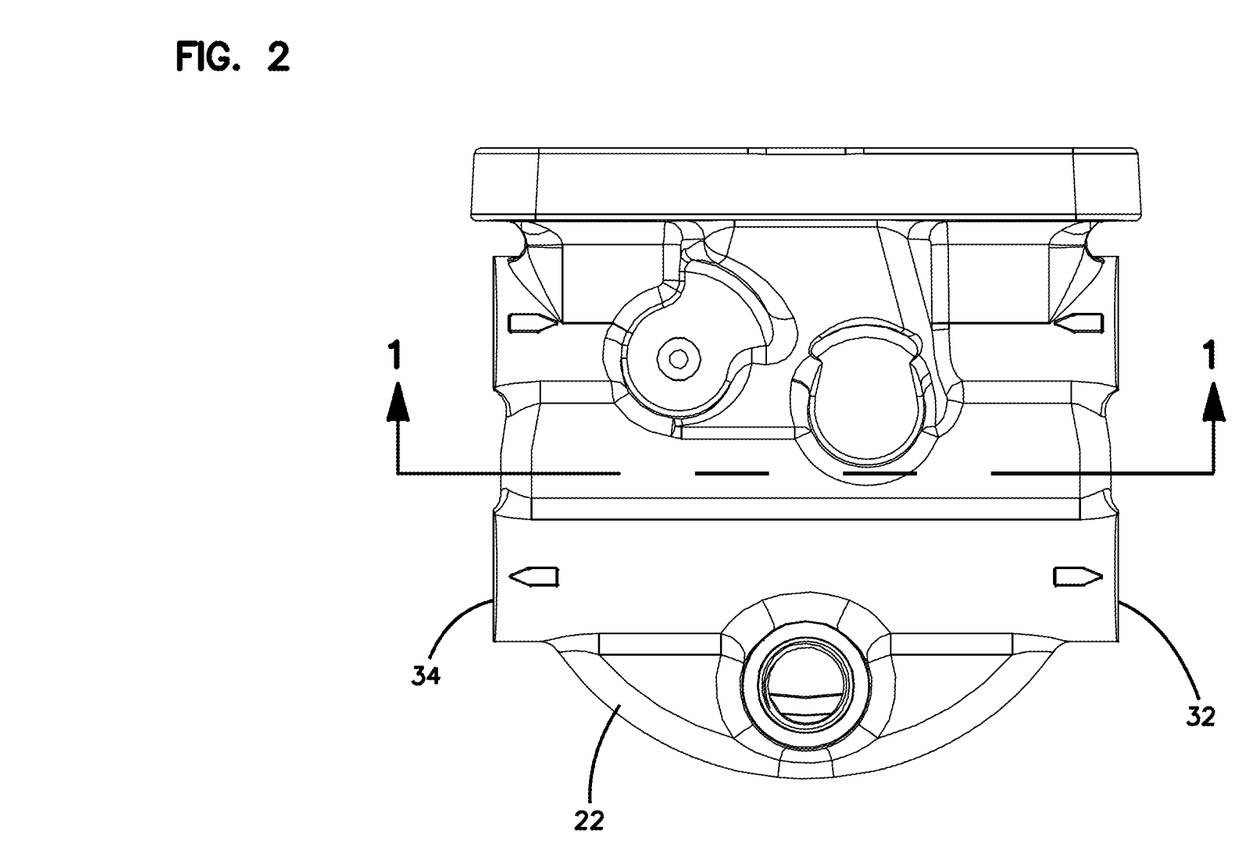
FIG. 2 is a top view of the filter assembly of FIG. 1.

FIG. 2 shows a top view of the assembly 10 of FIG. 1. The filter head 22 includes an inlet 32 and an outlet 34. Liquid to be filtered flows through the inlet 32, into the unfiltered liquid volume 18 of the housing 12, through the filter cartridge 16, into the filtered liquid volume 20, and then out through the outlet 34 of the filter head 22.

Figure 6:
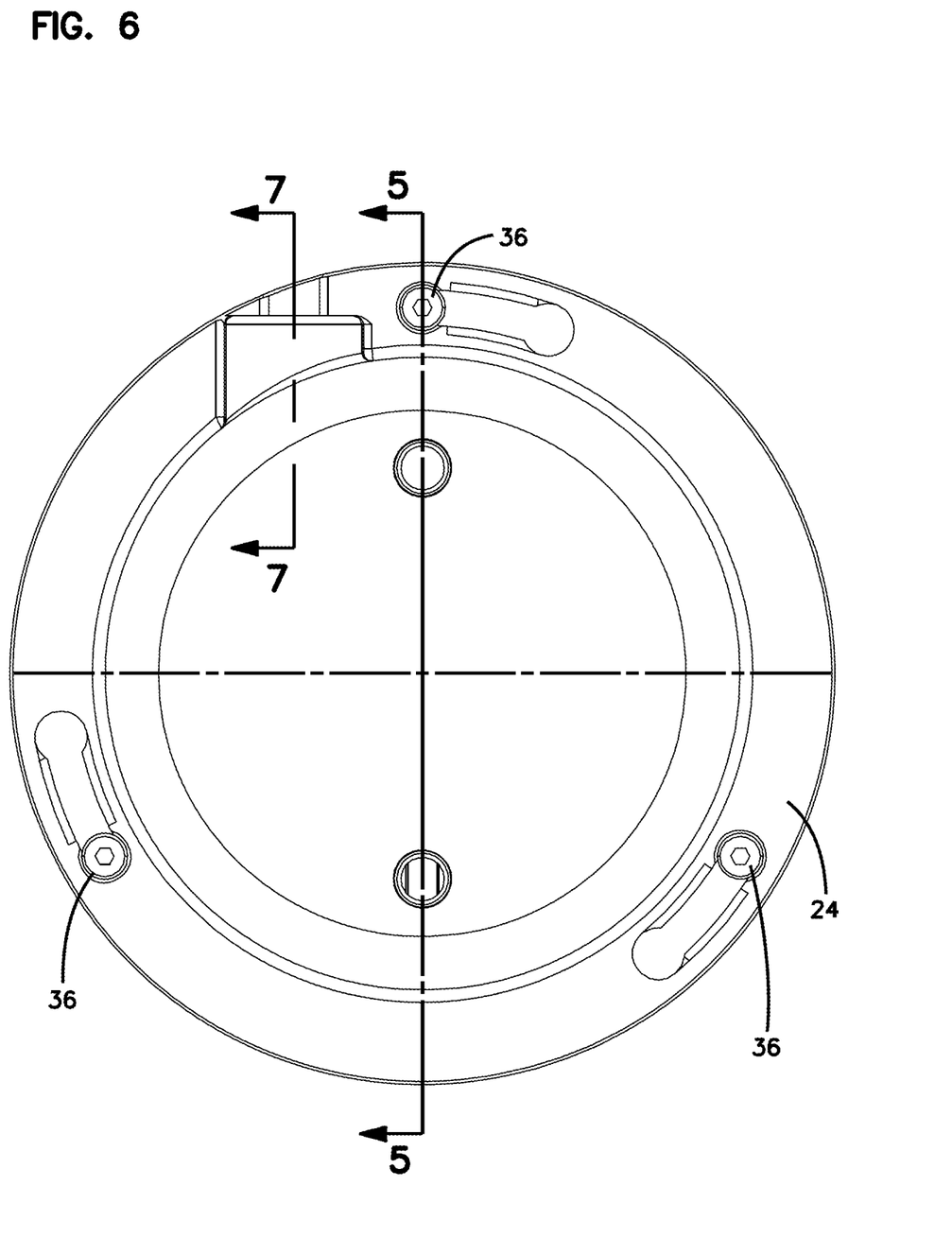
FIG. 6 is a top view of the assembly of FIG. 5.

For the assembly 10 of FIG. 5, the filter base 24 is removably attached to the housing 12 by a plurality of fasteners, such as bolts 36 (FIG. 6). A seal member 38 (FIG. 5) creates a face seal between and against a bottom flange 40 of the housing 12 and the filter base 24.

Figure 7:
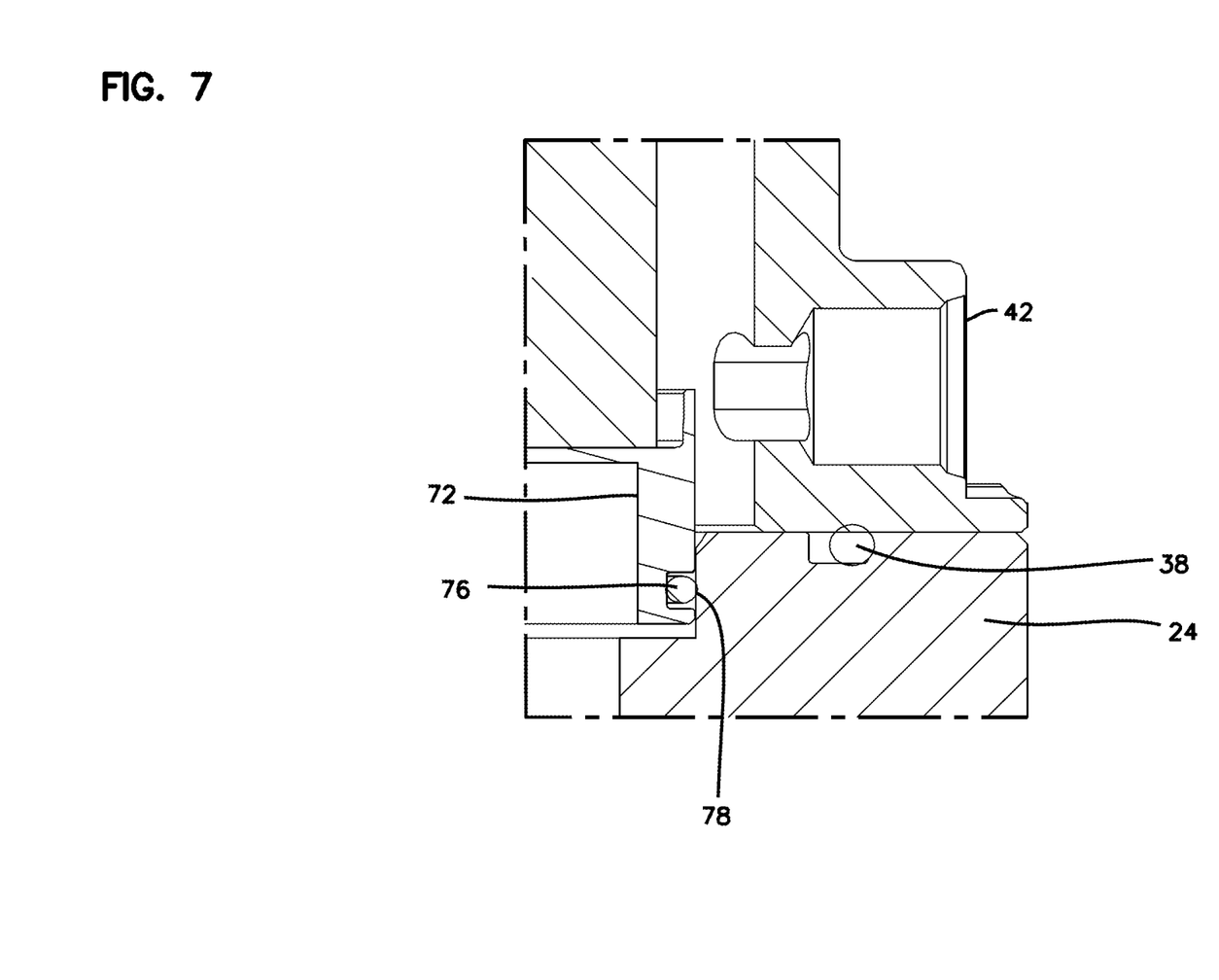
FIG. 7 is a partial cross-sectional view taken along the line 7-7 of FIG. 6.

The filter base 24 defines an inlet 42 (FIG. 7) for taking in unfiltered liquid, and an outlet 44 (FIG. 5) for the exit of filtered liquid. In general, liquid, such as fuel, to be filtered flows into the filter base 24 through the inlet 42 and then into the unfiltered liquid volume 18. From there, it flows through the filter cartridge 16 and into the filtered liquid volume 20. From there, it flows through a standpipe 46 and then exits the filter base 24 through the outlet 44. The standpipe 46 extends vertically from the filter base 24 into the filtered liquid volume 20.

Both the assemblies 10 of FIGS. 1 and 5 include a drainage aperture 48. In FIG. 1, the drainage aperture 48 is part of the housing 12, and in the FIG. 5 embodiment, the drainage aperture 48 is part of the base 24. The drainage aperture 48 allows for the drainage or exit of liquid, such as water, that has been separated from the liquid (such as fuel) being filtered.

B. Example Filter Cartridge

The filter cartridge 16 can be either part of a spin-on filter assembly or a bowl-cartridge assembly. In both examples shown in FIGS. 1 and 5, the filter cartridge 16 is part of a bowl-cartridge assembly. This means that the filter cartridge 10 can be removed from the housing 12 and replaced with a new filter cartridge. In a spin-on assembly, the filter cartridge is not removable from the housing. To service the assembly, the entire filter housing and cartridge are removed from the filter head or base and replaced.

The filter cartridge 16 used in the assembly 10 of FIGS. 1 and 5 will have common features, and those common features will include the same reference numeral. Where there are differences, different reference numerals will be used.

The filter cartridge 16 includes a first end cap 50. In the embodiment of FIG. 1, the first end cap 50 is an open end cap defining an opening 52 in communication with the filtered liquid volume 20. In the FIG. 5 embodiment, the first end cap 50 is a closed end cap. More details about the first end cap 50 for each embodiment is discussed further below.

The filter cartridge 16 further includes an opposite second end cap 54. In the FIG. 1 embodiment, the second end cap 54 is a closed end cap, and in the embodiment of FIG. 5, the second end cap 54 is an open end cap having an opening 56 in communication with the filtered liquid volume 20.

The filter cartridge 16 further includes a tubular extension of filter media 58. The tubular extension of filter media 58 defines an open interior volume 60 downstream of the filter media 58. The interior volume 60 is part of the filtered liquid volume 20.

The filter media 58 can be many different types of media and is preferably pleated media 62. The pleated media 62 forms the tubular extension, and preferably the tubular extension is cylindrical in shape having a round cross section.

The filter media 58 extends between the first and second end caps 50, 54. In the embodiment depicted, the media 58 is also secured to the first and second end caps 50, 54. The media 58 can be secured to the end caps 50, 54 by adhesive, potting, molding, and the like.

In the embodiment of FIG. 1, the first end cap 52 includes an axial extension 64. The axial extension 64 extends or projects toward the filter head 22 and away from the filter media 58. The axial extension 64 holds a seal member 66 (FIGS. 3 and 4) which forms a seal 68 (FIG. 4) with a neck 70 within the filter head 22. In the embodiment shown, the seal 68 is an outwardly directed radial seal. The seal member 66, in this embodiment, is an O-ring. Many embodiments are possible.

For the filter cartridge 16 of FIG. 5, the second end cap 54 includes an axial extension 72 projecting or extending toward the filter base 24 and away from the filter media 58. The axial extension 72, in this embodiment, is along or radially outside of outer radial pleat tips 74 of the pleated media 62.

The axial extension 72 holds a seal member 76. The seal member 76 forms a seal 78 between and against the second end cap 54 of the filter cartridge 16 and the filter base 24. In this embodiment, the seal 78 is an outwardly directed radial seal, although alternatives are possible.

Still in reference to FIG. 5, the seal 78 is an outwardly directed radial seal, although alternatives are possible.

Still in reference to FIG. 5, the second end cap 54 also defines an inner axial ring 80. The axial ring 80 extends or projects axially toward the filter base 24 and away from the media 58. The ring 80 is radially inside of the inner pleat tips 82.

The inner ring 80, in this embodiment, has a threaded section 84 that threadably attached to the stand pipe 46. The inner ring 80 forms a removable connection with an outlet pipe 86 within the filter base 24. The outlet pipe 86 includes a seal member 88 forming a seal with the inner ring 80. In the embodiment shown, the seal member 88 is an inwardly extending radial seal, although alternatives are possible.

The filter cartridge 16 includes an air channel to allow the venting or bleeding of trapped air. This is described further below.

C. Example Air Channels

As mentioned previously, the filter assembly 10 includes features that allow air to escape the filter assembly 10 and that limits the amount of unfiltered liquid that is allowed to bypass the filter media 58 to get to the filtered liquid volume 20. These features include structure that is restrictive to the flow of the liquid, such as fuel. Due to the viscosity differences of air versus liquid (e.g. a hydrocarbon such as fuel or oil), a long vent with at least one thin axis impedes liquid flow to a greater degree than air flow through the same vent In general, the first end cap 50 includes a vent in the form of an air channel 90. The air channel 90 has an inlet 92 and an outlet 94. The inlet 92 is in communication with the unfiltered liquid volume 18, which is the volume upstream of the filter media 58. The outlet 94 is in communication with the filtered liquid volume 20, which is part of the open filter interior 60 downstream of the filter media 58.

The channel 90 allows for the flow of air and restricts the flow of liquid, such as fuel. It has been found that if the channel 90 has an average cross-sectional area of no greater than 0.3 mm^2 and a length between the inlet and outlet of at least 10 mm, the channel 90 will allow for the flow of air but be very restrictive to the flow of fuel. As previously mentioned, a long channel 90 with at least one thin axis impedes liquid flow to a greater degree than air flow through the same channel because of the differences in viscosity between air and liquid.

In many cases, it has been found that the channel 90 should have a cross-sectional area of at least 0.06 mm^2, and typical usable cross-sectional areas are 0.08-0.4 mm^2. A length between the inlet 92 and outlet 94 should be at least 10 mm, and typical lengths will be between 25-75 mm.

One way to determine the average cross-sectional area is to multiply the average width by the average height of the channel. The length is determined by measuring the distance an air molecule would follow between the inlet 92 and outlet 94. The height, as defined herein, is the minimum dimension of the channel 90.

The channel 90 has a length that is greater than 30 times the average height.

The channel 90 has an average width at least 4 times the average height with the average height less than 0.3 mm and typically will be less than 0.2 mm. In many instances, the length of the channel 90 between the inlet 92 and outlet 94 will be at least 10 mm, and typically will be in a range of 25-75 mm.

Figure 3:
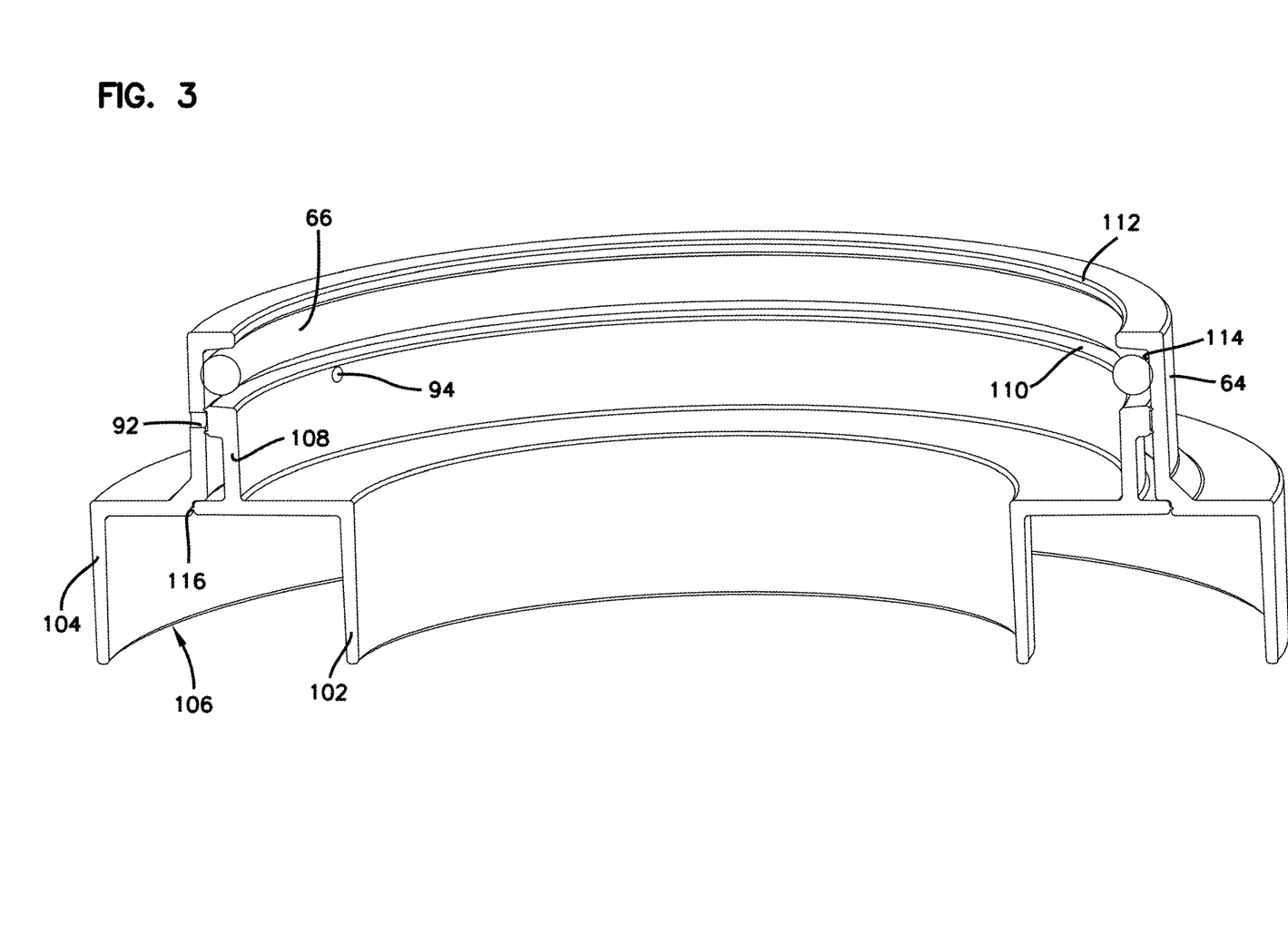
FIG. 3 is an enlarged perspective view of one of the end caps used in the filter cartridge of FIG. 1.
Figure 4:
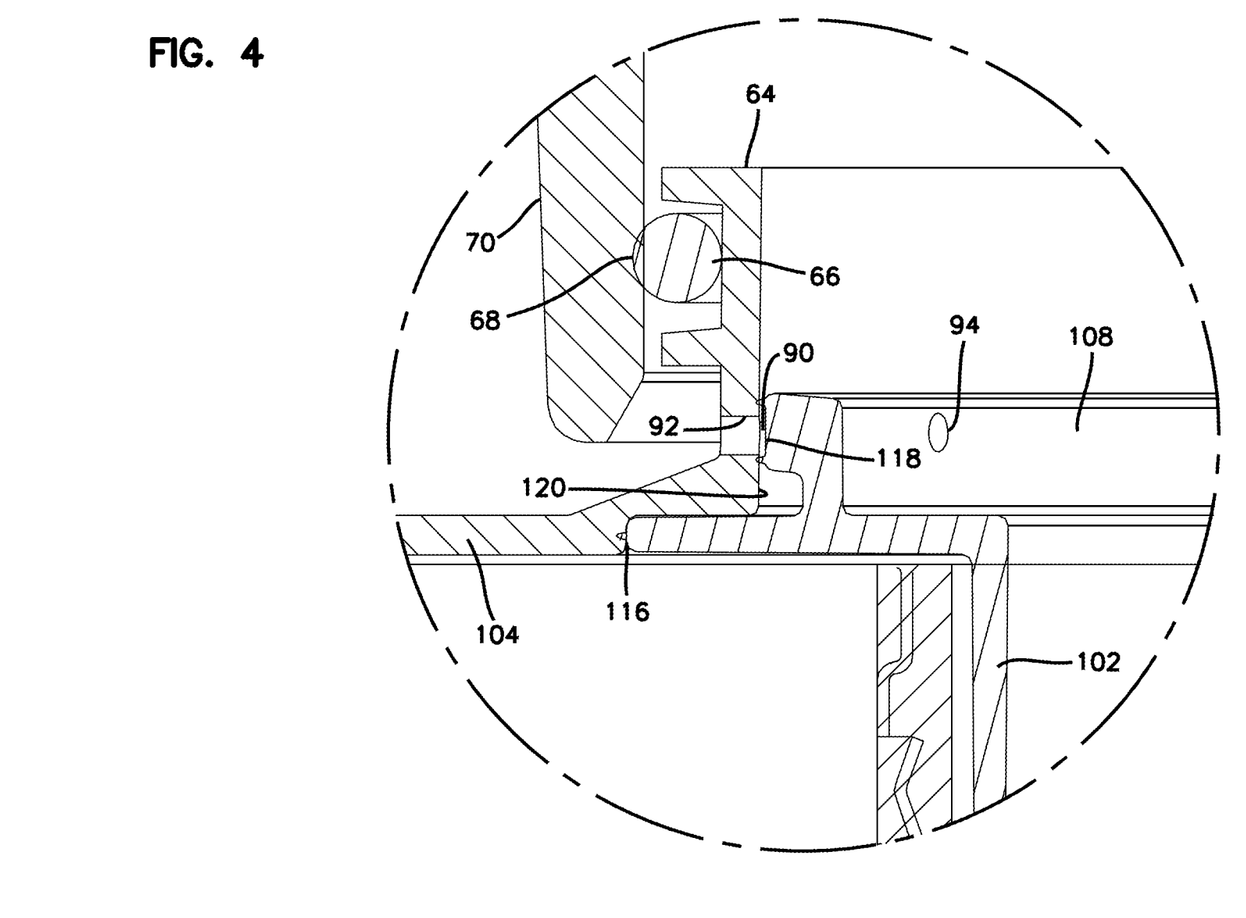
FIG. 4 is an enlarged view of section A-A of FIG. 1.

Attention is directed to the embodiment of FIGS. 1-4. In this embodiment, the channel 90 is part of the first end cap 50, which is an open end cap. The open end cap 50 includes an inner end cap piece 102 and an outer end cap piece 104 secured together. As can be seen in FIG. 3, the inlet 92 for the channel 90 is defined by the outer end cap piece 104, while the outlet 94 for the channel 90 is defined by the inner end cap piece 102. The inner end cap piece 102 also defines the channel 90, as can be seen in FIG. 4. Alternatives are possible.

Still in reference to FIG. 3, the inner end piece 102 and the outer end cap piece 104 fit together to form a downward facing U-shaped cap piece 106. The U-shaped cap piece 106 is the portion of the first end cap 50 that is secured to the filter media 58.

As previously mentioned, the first end cap 50 includes an axial extension 64. The axial extension 64, in this embodiment, is part of the outer end cap piece 104. The inner end cap piece 102 also has an axial extension 108. The axial extension 108 is shorter than the axial extension 64. A gap or space between a top end 110 of the axial extension 108 and a top end 112 of the axial extension 64 defines a seat 114 for the seal member 66.

The inner end cap piece 102 and outer end cap piece 104 can be secured together along the U-shaped cup piece 106 at a joint 116 along the base of the U-shaped cup piece 106. The joint 116 can be made by adhesive or heat staking or ultrasonics or other techniques.

In reference now to FIG. 4, the axial extension 108 of the inner end cap piece 102 has a radially outwardly extending face 118. The radially outwardly extending face 118 opposes an inwardly facing inner surface 120 of the axial extension 64 of the outer end cap piece 104. The face 118 defines the very small channel 90, and the channel 90 is trapped between the face 118 and the inner surface 120 of the end cap pieces 102, 104.

Figure 8:
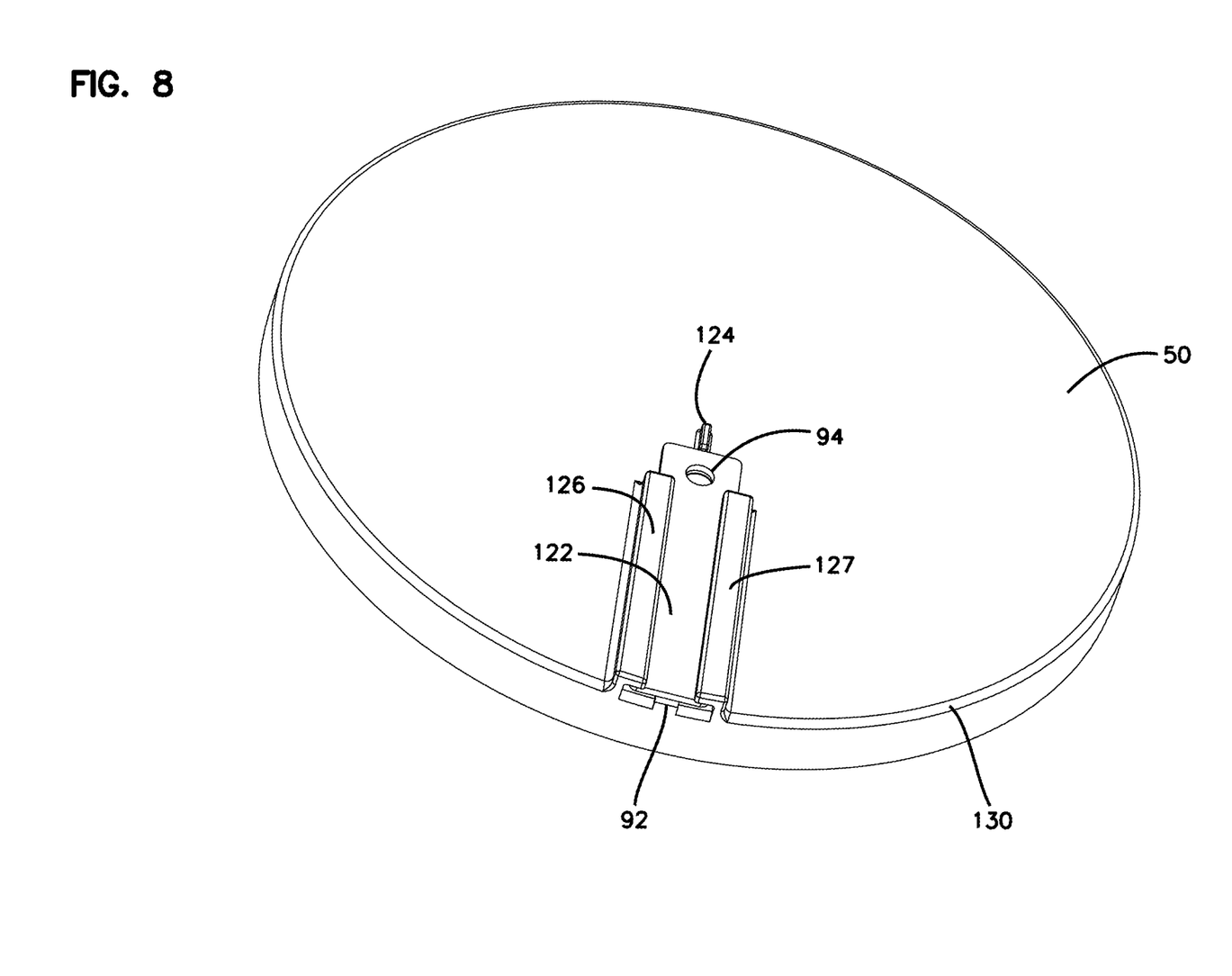
FIG. 8 is a perspective view of one of the end caps of the filter cartridge of FIG. 5.
Figure 9:
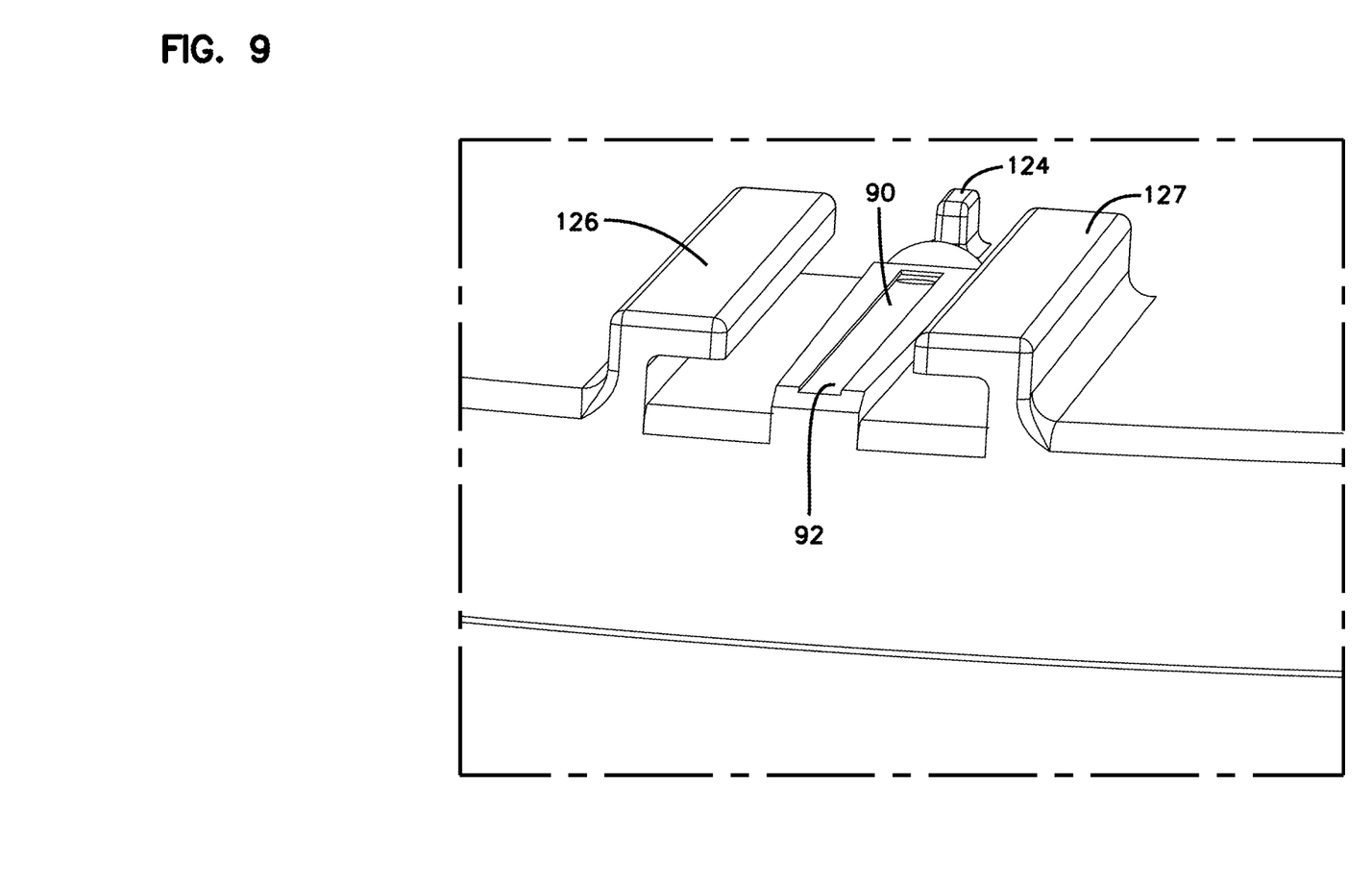
FIG. 9 is an enlarged perspective view of a portion of the end cap of FIG. 8.

Attention is directed to the embodiment of FIGS. 5-8. In this embodiment, the channel 90 is in the first end cap 50, which is a closed end cap. FIGS. 8 and 9 show close ups of the channel 90.

The channel 90 has inlet 92 along the outer rim of the closed end cap 50. The channel 90 extends radially inwardly from the inlet 92 to the outlet 94. It should be noted that the view in FIG. 8 is a view of the end cap 50 that faces toward the filter media 58 and the rest of the filter cartridge 16 such that the outlet 94 is in communication in the filter liquid volume 20 and the interior volume 60.

The channel 92 is covered by a cover or tab 122. The tab 122 is secured in position by an axial barb 124 and a pair of flanges 126, 127.

FIG. 9 illustrates a portion of the end cap 50, but without the tab 122 in position. The channel 90 can be seen along with the flanges 126, 127 along opposing sides of the channel 90. The barb 124 is at the end of the channel 90 inboard of the outer rim of the end cap 50. The tab 122 can be slid under the flanges 126, 127 to cover the channel 92. The barb 124 limits further radial motion of the tab 122. The tab 122 defines the outlet 94.

Figure 10:
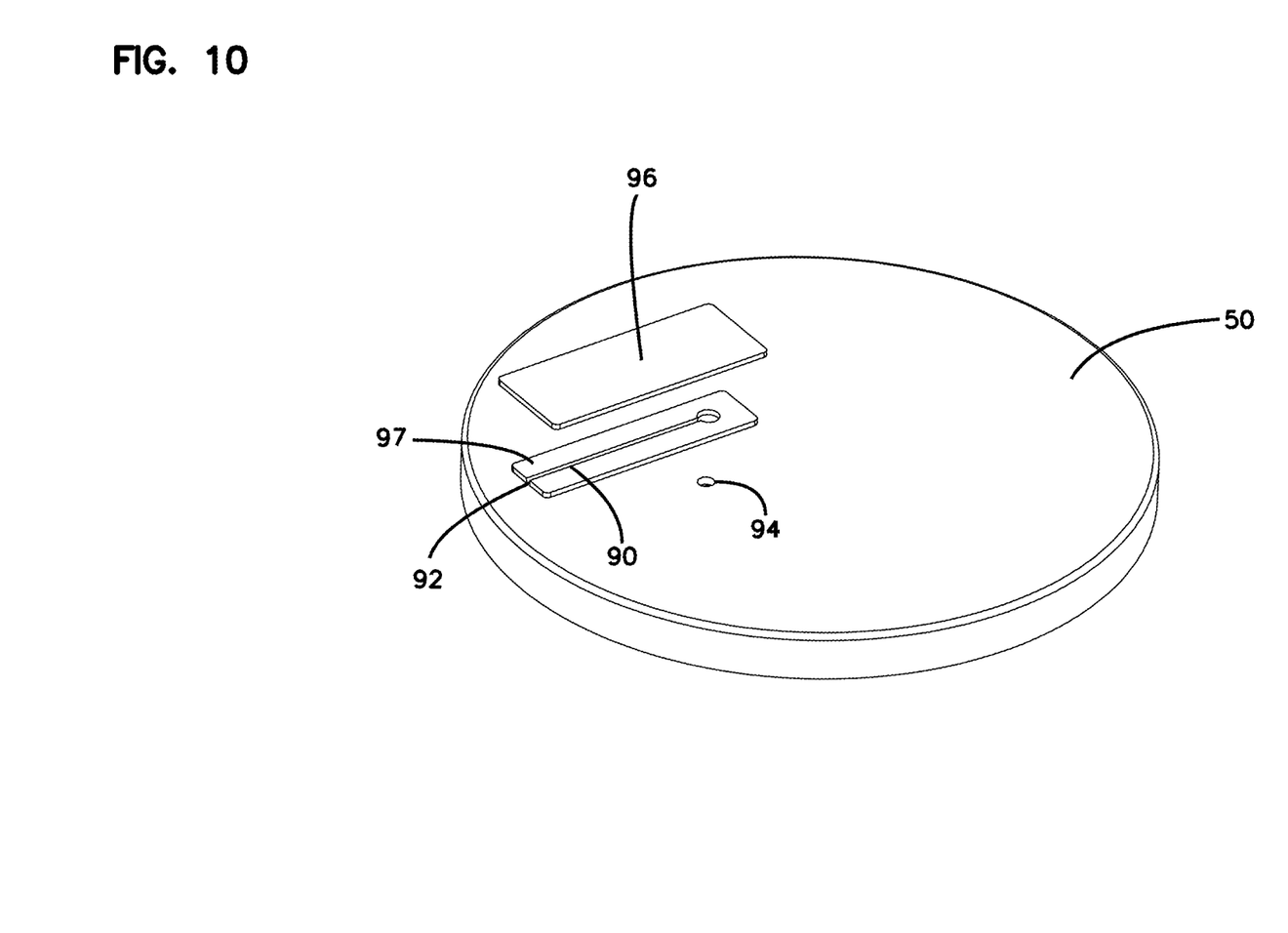
FIG. 10 is a perspective view of an alternative embodiment of one of the end caps usable in the filter cartridge of FIG. 5.

In the alternative embodiment of FIG. 10, the channel 90 is formed by adjoining at least two strips 96, 97 of a film material, or alternatively a thin polymer material, where the channel 90 is formed by removing a portion of one strip 96 of film or thin polymer.

D. Methods of Use

The filter assembly 10 can be used in a method of bleeding air from fuel in a filter assembly. The method includes permitting air to flow from the unfiltered liquid volume 18 to the open interior volume 60 downstream of the filter media 58 by entering through the air inlet 92, flowing through the channel 90, and then exiting through the air outlet 94 to enter the filtered liquid volume 20.

For the embodiment of FIGS. 1-4, the air flows through the inlet 92, which is part of the axial extension 64 of the first end cap 50. The air then flows along the face 118 defining the channel 90 and exits through the inlet 94, which is part of the axial extension 108 of the inner end cap piece 102.

In the embodiment of FIGS. 5-9, the air flows through the inlet 92 which is along the outer rim 130 of the closed end cap 50. The air flows along the channel 90, which is covered by the tab 122. The air then exits through the outlet 94, which is defined as a hole in the tab 122. From there, the air enters the interior volume 60 and the filtered liquid volume 20.

The above represents example principles. Many embodiments can be made using these principles.

We claim:

1. A filter cartridge for filtering fuel or oil, the filter cartridge comprising:
   (a) first and second opposite end caps;
     (i) the first end cap including an inner end cap piece and an outer end cap piece secured together;
   (b) a tubular extension of filter media defining an open interior volume downstream of the filter media; the filter media being secured to the inner end cap piece, outer end cap piece, and second end cap, and extending between the first and second end caps; and
   (c) the first end cap having an air channel with a radial inlet and an outlet; the outlet being (c) circumferentially spaced from the inlet; the inlet being in communication with a volume upstream of the filter media; and the outlet being in communication with the open interior volume downstream of the filter media; the outlet being defined by the inner end cap piece;
     (i) the channel having an average cross-sectional area no greater than 0.6 mm$^2$ and a length between the inlet and outlet of at least 12 mm.

2. The filter cartridge of claim 1 wherein the first end cap is an open end cap.

3. The filter cartridge of claim 2 wherein the first end cap has an axial extension extending away from the filter media; the air channel being in the axial extension.

4. The filter cartridge of claim 3 further including a seal member held by the axial extension.

5. The filter cartridge of claim 4 wherein the seal member is a radial seal.

6. The filter cartridge of claim 1, wherein the inlet for the air channel is defined by the outer end cap piece.

7. The filter cartridge of claim 1, wherein the inner end cap piece defines the channel.

8. The filter cartridge of claim 1 wherein the channel has an average height, and the length of the channel is greater than 30 times the average height.

9. The filter cartridge of claim 1 wherein the channel has an average height less than 0.3 mm.

10. The filter cartridge of claim 1 wherein the channel length is at least 10 mm.

11. The filter cartridge of claim 1 wherein the filter media is pleated media, and the tubular extension is cylindrical.

12. A filter assembly comprising:
   (a) the filter cartridge of claim 1;
   (b) a housing holding the cartridge and defining an unfiltered volume upstream of the filter cartridge; and
   (c) one of a filter head or filter base removably attached to the housing.

13. The filter assembly of claim 12 wherein the filter cartridge is removable and replaceable in the housing.

14. The filter assembly of claim 12 wherein the filter head and the housing are threadably attached.

15. A method of bleeding air from liquid in a filter assembly; the method comprising:
   (a) providing the filter assembly of claim 12; and
   (b) permitting air to flow from the unfiltered volume to the open interior volume downstream of the filter media by entering through the air inlet, flowing through the channel, and exiting through the air outlet, while reducing liquid bypass.

16. A filter cartridge for filtering fuel or oil, the filter cartridge comprising:
   (a) first and second opposite end caps;
   (b) a tubular extension of filter media defining an open interior volume downstream of the filter media; the filter media being secured to the first end cap and to the second end cap, and extending between the first end cap and second end cap; and
   (c) the first end cap defining an air channel with a radial inlet integral to the first end cap and an outlet integral to the first end cap; the outlet being circumferentially spaced from the inlet; the inlet being in communication with a volume upstream of the filter media; and the outlet being in communication with the open interior volume downstream of the filter media;
     (i) the channel having an average cross-sectional area no greater than 0.6 mm$^2$ and a length between the inlet and outlet of at least 12 mm.

17. The filter cartridge of claim 16 wherein the first end cap is an open end cap.

18. The filter cartridge of claim 16 wherein the first end cap has an axial extension extending away from the filter media; the air channel being in the axial extension.

19. The filter cartridge of claim 18 further including a seal member held by the axial extension.

20. The filter cartridge of claim 16 wherein the filter media is pleated media, and the tubular extension is cylindrical.

* * * * *